Jan. 10, 1961     S. R. FLORIAN     2,967,509
TIRE VALVE LEAK INDICATOR
Filed March 12, 1959
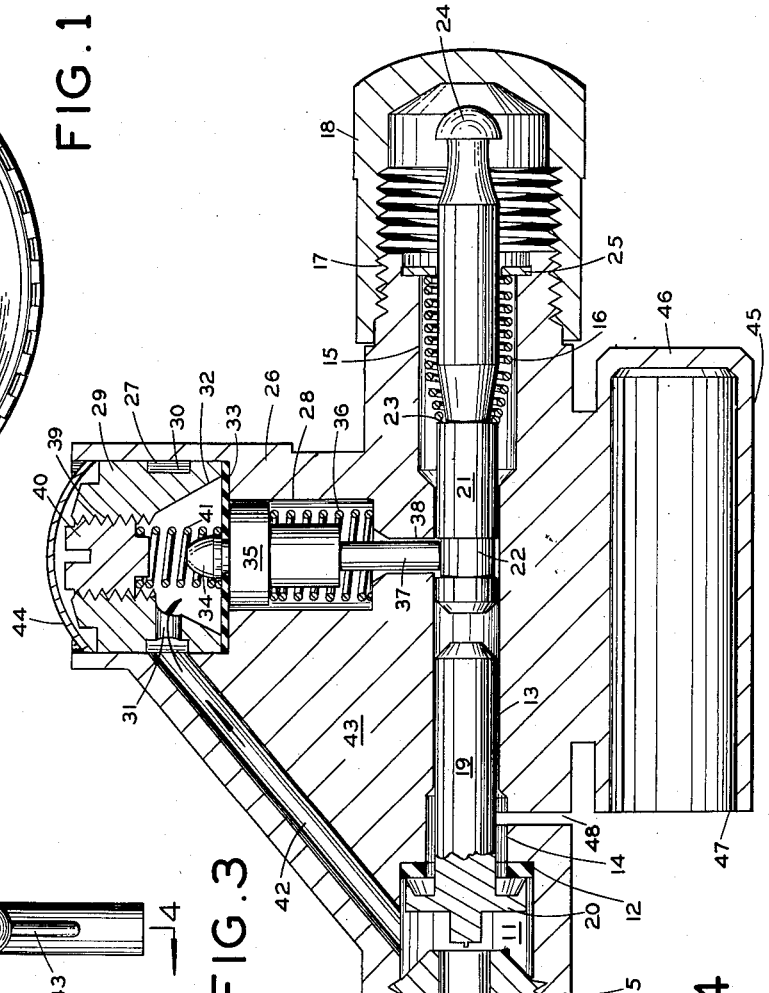
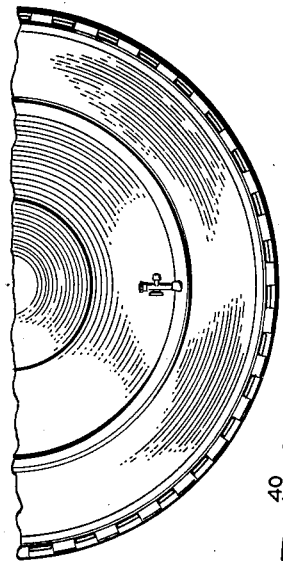
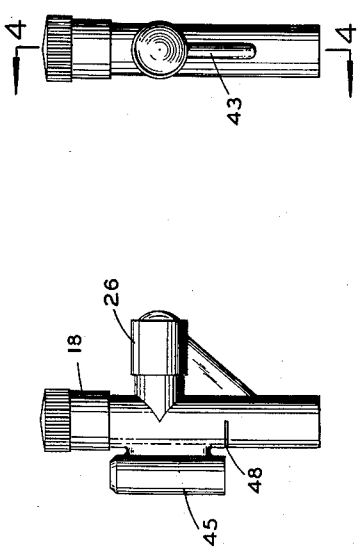
INVENTOR.
STEUART R. FLORIAN
BY
ATTORNEY

United States Patent Office 2,967,509
Patented Jan. 10, 1961

2,967,509

TIRE VALVE LEAK INDICATOR

Steuart R. Florian, 1551 Griffin Road, Dania, Fla.

Filed Mar. 12, 1959, Ser. No. 798,878

6 Claims. (Cl. 116—34)

This invention relates to audible signal devices for use upon the conventional valve stem of vehicle ground wheels and whereby to automatically sound a warning whistle when the pressure within the tire falls below the pressure normally required for a complete inflation of the tire.

The invention contemplates a novel assembly of parts having a threaded coupling that is adapted to engage the threaded end of the conventional valve stem and, when in the fully engaged position, defines a seal between the device and the valve stem and also simultaneously unseats the conventional valve stem core so that the full pressure within the tire will be exerted upon the mechanism of this device.

The device also includes an inner free floating valve device that controls the flow of air to the audible signal device and with the free floating valve being unseated by a plunger device when the pressure falls below the maximum pressure within the tire and with a trigger mechanism that is actuated when the pressure falls, to release the plunger and to unseat the floating valve so that the escape of air will actuate the whistle device with such volume as to be clearly heard by the driver or other occupants of the vehicle.

Other important objects and advantages of the device will be more clearly apparent during the course of the following description, reference being had to the accompanying drawings wherein has been illustrated a preferred form of the device and wherein like characters of reference are employed to denote like parts throughout the several figures.

In the drawings:

Figure 1 is a fragmentary side elevation of a vehicle wheel showing the device applied thereto, Figure 2 is a side elevation of the device prior to installation, Figure 3 is an end view of the device illustrated in Figure 2, and Figure 4 is a greatly enlarged longitudinal section taken substantially on line 4—4 of Figure 3.

Referring specifically to the drawings, the numeral 5 designates a cylindrical housing that is open at its opposite ends. The housing at its lower end, is internally threaded at 6 for the reception of a tubular seal plug 7. The plug 7 is circumferentially reduced at its lower end to receive a seal gasket 8. The plug 7 is centrally and axially bored throughout its length, as indicated at 7a. The plug 7 is also provided with an integral cross bar 9, that extends below the plug and that constitutes a means for unseating the convention valve core carried within the tire va'e stem and with the valve stem and valve core indicated fragmentarily at 10. The tire valve stem 10 has threaded engagement into the threads 6 for sealing engagement with the gasekt 8 and in such position, the bar 9 has unseated the valve core 10 within the valve stem so that the maximum pressure will be exerted outwardly to the mechanism to be hereinafter described. The housing 5 is further cylindrically chambered at 11 upwardly from the plug 7 and the upper end of the chamber is shouldered to form a seat for a seal gasket 12. The housing is further axially bored at 13 and with the bore 13 at its lower end being slightly enlarged at 14, for a purpose to be described. The bore 13 at the upper end of the housing is also enlarged in diameter, as at 15 to form a chamber for the reception of a coil spring 16. The upper end of the housing is externally threaded at 17 to receive a closure cap 18. Shiftable within the bore 13 is a valve rod 19, carrying at its lower end an enlarged cup valve 20 and with the marginal edges of the valve 20 adapted to seal against the gasket 12 to prevent the escape of air to the bores 13 and 14. The valve 20 and its rod 19 are biased to a sealing engagement with the gasket 12 by the pressurized air from the vehicle tire, flowing through the plug 7.

Means are provided to unseat the valve 20 at a predetermined time, depending upon a drop in the tire pressure, comprising a plunger 21, having a circumferential groove 22 adjacent its lower end. The plunger 21 is further reduced in diameter above the groove 22, to form a shoulder 23 functioning as a seat for the lower end of the spring 16. The upper end of the plunger 21 is reduced and shaped to form a semi-spherical head 24 that projects above the upper end of the housing, to be disposed within the cap 18. The function of the head 24 is to retract the plunger 21 against the tension of the spring 16. The spring at its upper end is held against movement outwardly of the bore 15 by a washer 25, that is preferably press-fitted into a cylindrical recess formed in the upper end of the housing.

The housing at one side is provided with a lateral cylindrical extension 26 that provides an enlarged bore 27 and a reduced bore 28. The bore 27 functions as a chamber for the reception of a ported plug 29, that is circumferentially grooved at 30 and with the walls of the plug being ported at 31. The plug 29 is further provided with a conical chamber 32 and with the port 31 also communicating with the chamber 32. Seated within the bottom of the bore 27 and held against displacement by the plug 29 is a diaphragm 33, connected with the diaphragm 33, through the medium of a lug 34 is a piston 35, that is shiftable in the bore 28. The piston 35 is biased outwardly by spring 36, with the spring engaging the piston 35 and the bottom of the bore 28 and whereby the piston and the diaphragm are biased in a direction outwardly with respect to the housing. The piston 35 carries a reduced cylindrical trigger pin 37. The pin 37 is shiftable under the influence of the movement of the piston 35 and is movable in a reduced bore 38, with the bore 38 communicating with the bore 28 and with the bore 13 of the housing at substantially right angle to each other. The pin 37 is adapted to normally engage within the groove 22 to prevent a downward movement of the plunger 21 under the influence of the spring 16. The plug 29 is preferably press-fitted or screwed into the bore 27 to the point where it bears against the diaphragm 33. The plug 29 is further axially apertured and threaded at 39, for the threaded reception of an adjusting screw 40. A balance screw 40. A balance spring 41 bears against the diaphragm at one end and is adjustably held at its upper end by the screw 40. The chamber formed by the bore 27 has communication with the chamber 11 through the medium of a diagonally arranged port 42, formed in an integral web portion 43. The screw 40 after adjustment is sealed against access by a semi-spherical disc 44 that is also preferably press-fitted and sealed with an adhesive into the upper open end of the bore 27.

Formed integral with the opposite side of the housing 5 is a tubular audible signal device 45, closed at its upper end as at 46 and open at its lower end as at 47. The open end of the signal device is in alignment with a slot 48 that is cut through the housing and that communicates with the enlarged bore 14. Since the signal device is actuated when the pressure within the tire falls below a predetermined reading, it becomes necessary that the springs 36 and 41 be so tensioned with respect to each other, that when the pressure falls within the chamber 32, the spring 36 will bias the piston 35 outwardly to flex the diaphragm 33 and to thereby move the pin 37 from its engagement with the groove 22 of the plunger 21, permitting the spring 16 to project the plunger 21 downwardly for unseating the valve 20. The valve 20 is made relatively smaller in diameter than the chamber 11 so as to permit a free flow of air past the valve, to the bore 14 and through the slot 48 to be projected across the open end 47 of the audible signal device 45.

In use, the conventional cap carried by the tire valve stem 10 is removed and the housing 5 firmly threaded thereon to the point where the valve stem 10 fully seats against the gasket 8, such seating action simultaneously unseating the valve within the valve stem mechanism 10. With the device adjusted through the medium of the screw 40, any degree of air pressure can be easily determined as the means to balance the release movement of the piston 35. With the housing in engagement with the valve stem mechanism 10, the full air pressure of the tire will travel through the bore 7a of the plug 7, such pressure seating the valve 20 and also passing through the port 42 to the chamber 32, maintaining the diaphragm in a position where the pin 37 is in latched engagement with the plunger 21. When the air in the tire falls below the minimum pressure desired, the spring 36 will bias the piston 35 outwardly, pulling the pin 37 out of the groove 22 and permitting the plunger 21 to be biased downwardly by the spring 16 to engage the rod 19 and to unseat the valve 20, permitting air to flow past the valve 20 to the bore 14 and through the slot 48 blowing across the open end of the signal device 45 and creating a relatively loud whistling sound thus indicating to the driver of the vehicle that the pressure has fallen below the required maximum. When the valve 20 is unseated, it will be substantially floating, since the air is passing around the edges thereof to escape through the slot 48. The whistling will continue so long as the pressure in the tire is below the maximum release point. The audible signal indicates to the driver that an abnormal condition exists and provides adequate time for the tire to be removed from the vehicle for such repair as is necessary. When the tire has been repaired, the housing 5 is again connected with the valve stem as before stated. The cap 18 is then removed and the operator engages the head 24 to pull the plunger 21 upwardly to again permit the trigger pin 37 to snap within the groove 22. The purpose of the adjusting screw 40 is to regulate the device so as to adapt it to any given tire pressure and it will be obvious, that after the adjustment has been made, the disk 44 is forced into position as an air seal and to cover the screw 40 to prevent any unauthorized movement of the screw beyond its point of adjustment for a particular tire pressure.

Having described my invention, what I claim as new and desire to secure by Letters Patent is:

1. A signal device for indicating an abnormal air pressure in a vehicle tire, that comprises a molded elongated housing of cylindrical shape, the housing being provided with an axial bore and open at its upper and lower ends, the bore at the lower end of the housing being enlarged and internally threaded to have threaded connection with a threaded end of a tire valve stem, a threaded cylindrical plug that also has threaded engagement into the threads of the enlarged bore, the plug having an annular reduced lower end to fixedly receive a compressible seal gasket that is adapted to have sealed engagement with the end of the tire valve stem, the plug being provided with an axial port therethrough, the lower end of the plug also having an integral transversely extending bar that projects downwardly to lie in the path of movement of an upwardly projecting valve core whereby to unseat the valve core when the housing is disposed in full threaded relation to the valve stem, the enlarged bore being concentric to the bore of the body portion and forming a shoulder at the upper end of the enlarged bore, a gasket disposed in the enlarged bore and seated against the shoulder, a valve axially movable in the enlarged bore to bear against the last-named gasket, a valve rod carried by the last-named valve and that is slidable in the bore of the body portion, the last-named valve being biased to a seating engagement against the last-named gasket under the influence of pressurized air from the tire when the valve core is unseated, a plunger also shiftable in the bore of the housing in opposed relation to the last-named valve rod, spring means for biasing the plunger in a direction toward the valve rod whereby to unseat valve when pressure condition exists in the tire that is below the predetermined required pressure, a latch device that is biased toward and from a latching engagement with the plunger, the latch being biased to a latched engagement with the plunger under the influence of air pressure that is in accordance with the required tire pressure, the latch being biased to a release position with respect to the plunger by a spring that is operable to shift the latch to a release position when the tire pressure has been sufficiently lowered, an audible signal device formed on the housing, the housing being provided with an air escape slot that communicates with the bore of the housing above the first-named valve, the first-named valve when unseated by the plunger permitting the escape of air from the tire to pass outwardly through the slot to activate the signal.

2. The structure according to claim 1, wherein the housing is laterally extended and provided with an open cylindrical chamber, the chamber being extended inwardly to form a reduced piston chamber, a flexible diaphragm disposed in the bottom of the first chamber to overlie the piston chamber, a piston operable in the chamber and connected to the diaphragm, a latch pin carried by the piston and that projected through a port in the housing to communictae with the bore of the housing and to be normally disposed in the path of movement of the plunger, closure means for the first chamber, a pressurized and by-pass port formed in the housing for directing pressurized air from the tire to the first chamber and for engaging the diaphragm and holding the piston and its latch pin in the latching engagement with the plunger when the air is at a predetermined pressure, spring means in the piston chamber for biasing the piston toward a release position in opposition to the air pressure and an adjustable balance spring in the first chamber in opposed relation to the spring in the piston chamber.

3. The structure according to claim 1, wherein the housing inwardly of the plug constitutes a valve chamber for the last named valve and with the chamber being concentric to the bore and proportionately larger in diameter to the valve, the last named chamber communicating with a relatively smaller concentric bore and with the last named bore being relatively larger than the bore of the housing, the housing being laterally slotted and with the slot communicating with the last named bore, the housing being extended to form an integral hollow shell that is open at its lower end and the open end being in direct laterally alignment with the slot.

4. The structure according to claim 1, wherein the plunger is circumferentially grooved adjacent its lower end, the groove adapted to receive the end of the latch pin when the plunger is in an upper inoperative position.

5. The structure according to claim 2, wherein a plug has a press-fit or threaded engagement in the first chamber, the plug having an internal chamber, the plug being circumferentially grooved and with the plug being provided with a radially port or ports that establish communication between the groove and the internal chamber, the plug bearing upon the diaphragm, the plug being provided with an axial threaded opening, a screw threaded into the opening and a spring engaging the screw and the top of the diaphragm, the last named spring being in opposed relation to the movement of the diaphragm and whereby to control the movement of the piston and the piston pin under varying degrees of air pressure.

6. The structure according to claim 1, wherein the plunger at its upper end is provided with a reset head and whereby to manually reset the plunger against the tension of its spring and whereby to permit the reengagement of the latch, the upper end of the housing being externally threaded and a closure cap removably engaging the threads and whereby to house the reset end of the plunger.

References Cited in the file of this patent

UNITED STATES PATENTS

| | | |
|---|---|---|
| 960,246 | Ashmore | June 7, 1910 |
| 1,078,061 | Palo | Nov. 11, 1913 |
| 1,952,164 | Goyett | Mar. 27, 1934 |